US009942635B1

(12) United States Patent
Kemppinen et al.

(10) Patent No.: US 9,942,635 B1
(45) Date of Patent: Apr. 10, 2018

(54) AUDIO DEVICE WITH MOVABLE DISPLAY

(71) Applicant: Microsoft Technology Licensing, LLC, Redmond, WA (US)

(72) Inventors: Pasi Tuomo Antero Kemppinen, Tampere (FI); Jarmo Olavi Kenttälä, Pirkkala (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/272,369

(22) Filed: Sep. 21, 2016

(51) Int. Cl.
*H04R 1/02* (2006.01)
*H04R 11/06* (2006.01)
*H04R 11/02* (2006.01)

(52) U.S. Cl.
CPC ............ *H04R 1/021* (2013.01); *H04R 1/028* (2013.01); *H04R 11/02* (2013.01); *H04R 11/06* (2013.01); *H04R 2499/11* (2013.01); *H04R 2499/15* (2013.01)

(58) Field of Classification Search
CPC ........ H04R 19/005; H04R 1/02; H04R 1/028; H04R 2201/003; H04R 23/006; H04R 2499/15; H04R 31/00; H04B 1/3888; H04B 1/082; H04B 1/38; H04B 1/3833; H04B 2001/3894; H04N 13/0402; H04N 13/0018; H04N 13/0022
USPC ........ 381/333, 386, 300, 332, 336, 111, 116, 381/117, 56–59; 345/173, 174, 169, 156, 345/108
See application file for complete search history.

(56) References Cited

U.S. PATENT DOCUMENTS

| 7,657,042 | B2 * | 2/2010 | Miyata | G02F 1/133 |
| | | | | 381/152 |
| 8,816,977 | B2 * | 8/2014 | Rothkopf | G06F 1/1652 |
| | | | | 345/108 |
| 8,854,319 | B1 | 10/2014 | Nickson et al. | |
| 9,131,299 | B2 * | 9/2015 | Nabata | H04R 17/00 |
| 2007/0252810 | A1 | 11/2007 | Ranta et al. | |
| 2009/0129623 | A1 | 5/2009 | Weckstrom et al. | |

(Continued)

FOREIGN PATENT DOCUMENTS

| EP | 2673944 A2 | 12/2013 |
| WO | 2011015236 A1 | 2/2011 |
| WO | 2012129247 A2 | 9/2012 |

OTHER PUBLICATIONS

Reisinger, Don, "Gadget screen as speaker, too? Motorola wants to make it so", Published on: Jun. 15, 2012, 2 pages Available at: http://www.cnet.com/news/gadget-screen-as-speaker-too-motorola-wants-to-make-it-so/.

(Continued)

*Primary Examiner* — Lun-See Lao

(57) ABSTRACT

An audio device is described which comprises a housing holding electronic components and having a face being substantially covered by a layer of transparent material. The audio device has a display comprising a layer of display material supported under at least part of the layer of transparent material; and at least one display actuating element in the housing configured to flex the display and the layer of transparent material to generate sound waves. There is at least one air cavity formed between the layer of display material and the housing; and an entrance formed in the layer of transparent material to allow air to pass between the air cavity and an exterior of the device.

20 Claims, 11 Drawing Sheets

(56) References Cited

U.S. PATENT DOCUMENTS

| | | |
|---|---|---|
| 2010/0225600 A1 | 9/2010 | Dai et al. |
| 2013/0259274 A1 | 10/2013 | Hayashi et al. |
| 2013/0301856 A1 | 11/2013 | Kim et al. |
| 2014/0114201 A1 | 4/2014 | Watanabe et al. |
| 2014/0145836 A1 | 5/2014 | Tossavainen et al. |
| 2014/0301596 A1 | 10/2014 | Wang et al. |
| 2014/0362020 A1 | 12/2014 | Rothkopf et al. |
| 2015/0373441 A1 | 12/2015 | Behles et al. |
| 2016/0004311 A1 | 1/2016 | Yliaho |

OTHER PUBLICATIONS

"International Search Report and Written Opinion Issued in PCT Application No. PCT/US2017/051434", dated Nov. 29, 2017, 12 Pages.

\* cited by examiner

AUDIO DEVICE WITH MOVABLE DISPLAY

BACKGROUND

Mobile communications devices with movable displays, also known as audio displays have visual display screens which are able to function as a loudspeaker as well as a visual display screen. Such displays are movable by flexing for example and this generates sound waves.

Existing audio displays are difficult to use in products such as mobile phone handsets and tablet computers for a variety of reasons. For example, the movement of the display is typically very small so that low frequency reproduction is very modest making it difficult for sound reproduction requirements to be met. As a result users may be unable to perceive the audio signal correctly leading to communication problems.

Another issue with audio displays in general concerns privacy. As the whole audio display emits sound, then in the case of a mobile phone handset where the whole display emits sound, many people in the vicinity of the handset are able to hear the emitted sound in addition to the user of the mobile phone handset. This is found to be the case even where the user's ear is against the display surface.

The embodiments described below are not limited to implementations which solve any or all of the disadvantages of known audio devices.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

An audio device is described which comprises a housing holding electronic components and having a face being substantially covered by a layer of transparent material. The audio device has a display comprising a layer of display material supported under at least part of the layer of transparent material; and at least one display actuating element in the housing configured to flex the display and the layer of transparent material to generate sound waves. There is at least one air cavity formed between the layer of display material and the housing; and an entrance formed in the layer of transparent material to allow air to pass between the air cavity and an exterior of the device.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Although the present examples are described in the context of a mobile communications device, it is also possible to have an audio device which is not a communications device, or which is not a mobile device. For example, the device 100 described below is a tablet computer in some examples which is able to present audio to users by using its display screen as a loudspeaker. For example, the device 100 described below is a game console, wearable computer, in vehicle computer or other audio device which is able to present audio to users by using a display screen as a loudspeaker.

Figure 1:
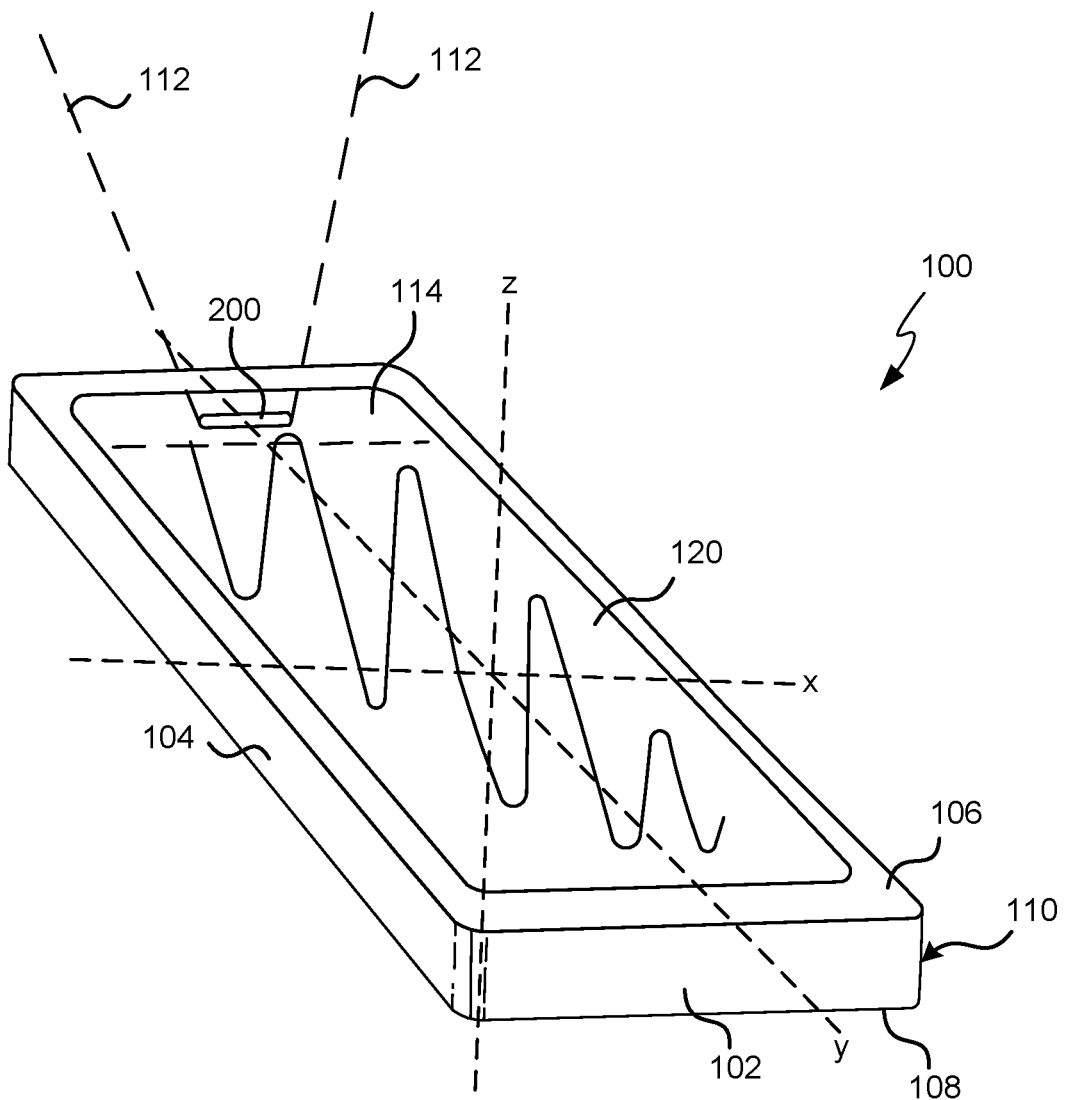
FIG. 1 is a schematic diagram of a mobile communications device having an audio display.

FIG. 1 is a schematic diagram of a mobile communications device 100 having an audio display. The mobile communications device 100 has a housing 110 holding electronic components (shown later in FIG. 5) and having a front face 106 and a back face 108 connected by side faces 102, 104. The front face 106 is substantially covered by a layer of transparent material 120 such as glass or plastic. The mobile communications device has a display comprising a layer of display material (shown later in FIG. 5) supported under at least part of the layer of transparent material 120. For example, the display material is flexible plastic organic light-emitting diode (POLED) material. However, this example is not intended to be limiting and other types of display material may be used such as glass OLED or a liquid crystal display (LCD) with a laminated backlight construction. Electronic ink (E-ink) displays may also be used.

In some examples the display material extends over some but not all of the front face 106 of the mobile communications device. For example, the region 114 in FIG. 1 has no display material and is referred to herein as a non-display region. In the example of FIG. 1 the non-display region is covered by the layer of transparent material 120.

The mobile communications device 100 has at least one display actuating element in the housing 110. The display actuating element is configured to flex the display material and the layer of transparent material to generate sound waves. The display actuating element is any one or more of: a piezoelectric element, a piezo electric motor, a dynamic motor, an electro-static motor. A motor is arranged in some examples so that it is connected to a display stack and acts to cause bending of the display. For example, the motor is not connected directly to a housing of the mobile communications device. In some examples the display actuating element is connected only to the layer of display material. In some examples the display actuating element is connected to both the layer of display material and a housing of the mobile communications device. In some examples the actuating element is connected to the layer of transparent material 120 and/or a housing of the mobile communications device.

The display actuating element is connected to an amplifier which amplifies an audio signal prior to output at the audio display. The amplifier is housed in the housing 110. In some examples the amplifier is located close to a piezo electric or other motor, and is connected to a display module of the mobile communications device 100.

There is at least one air cavity formed between the layer of display material and the housing 110 and an entrance 200 formed in the layer of transparent material 120 to allow air to pass between the air cavity and an exterior of the device 100.

As illustrated by the schematic wave form in FIG. 1, when the display actuating element operates to flex the display material and the layer of transparent material 120 there is motion with respect to the dotted axes indicated in FIG. 1 which represent axes of the mobile communications device. This motion generates changes in air pressure and so causes sound waves to propagate away from the whole front face 106 of the mobile communications device 100. It is found empirically that the motion of the layer of transparent material 120 and display material generates relatively high frequency sound waves in the range of sound waves typically perceived by a human listener.

In the embodiments described herein an entrance 200 is formed in the layer of transparent material 120 to allow air to pass between an air cavity in the housing and an exterior of the device 100. The volume of the air cavity changes as the layer of display material moves, because the air cavity abuts the layer of display material, for example, by having at least part of a wall of the air cavity formed from the layer of display material. As the volume of the air cavity changes the pressure in the air cavity also changes and this generates sound waves which emanate from the entrance 200 and radiate away from the mobile communications device within a cone shaped volume as indicated by dotted lines 112. The sound waves which are generated by the air cavity are found empirically to be of lower frequency than the sound waves generated by the movement of the layer of transparent material 120. In this way a low frequency component of the audio signal which is being reproduced by the audio display is boosted. In addition, due to the shape of the entrance 200 (and the shape of a channel leading to the entrance 200 in some cases) the reproduced audio signal is given a directionality (as indicated by the cone volume indicated in FIG. 1) which enhances privacy during operation of the audio display.

Figure 2:
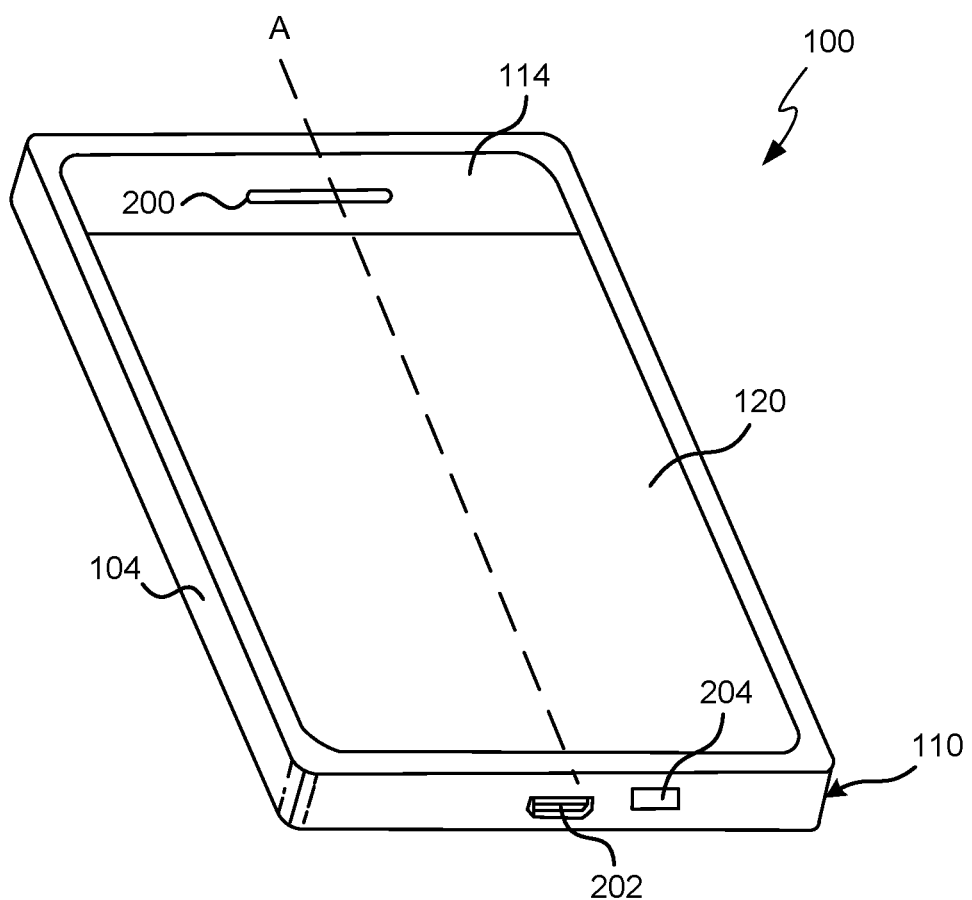
FIG. 2 is a schematic diagram of a mobile communications device with an audio display and an entrance to an air cavity.

FIG. 2 is a schematic diagram of a mobile communications device 100 with an audio display and an entrance 200 to an air cavity. The housing 110 of the mobile communications device is visible and there is a mini universal serial bus connection port shown at 202. The entrance comprises any one or more of: at least one slot in the layer of transparent material 120, a hole in the layer of transparent material 120, a mesh in the layer of transparent material 120. In the example of FIG. 2 the entrance is a substantially rectangular slot in the layer of transparent material 120. However, this is not essential. It is also possible to have a plurality of holes instead of, or as well as the slot 200, or to use a mesh that allows air to pass through. In some examples the entrance 200 is substantially sealed against moisture and dust particles using a protective material which is pervious to air. For example a dark mesh is used in some examples such as a polyester polymer precision woven mesh which has a flat frequency response over a large range, provides protection from dust, metal particles and liquids, and enables airflow control.

In some examples the entrance 200 is located substantially at an edge of the front face. For example, where the mobile communications device is substantially rectangular the entrance is located at a short edge of the front face. In some cases the mobile communications device is sized and shaped to be held in one hand and placed against an ear of a user, and the entrance 200 is located substantially in the center of an edge of the front face. In this way the entrance 200 is positioned close to an ear of a user when the mobile communications device is in use to listen to an audio signal such as an incoming phone call. In some examples, the entrance 200 is spaced away from a microphone 204 which is supported in the housing and located at an opposite end of the mobile communications device 100 from the entrance 200.

In some examples the front face 120 comprises a non-display region 114 being a region of the transparent material 120 under which the display material is absent, and wherein the entrance 200 is in the non-display region. Where the air cavity is located under the layer of display material, an air channel is used from the entrance 200 to the air cavity. The air channel enables air to flow to and from the air cavity and an exterior of the device.

Figure 3:
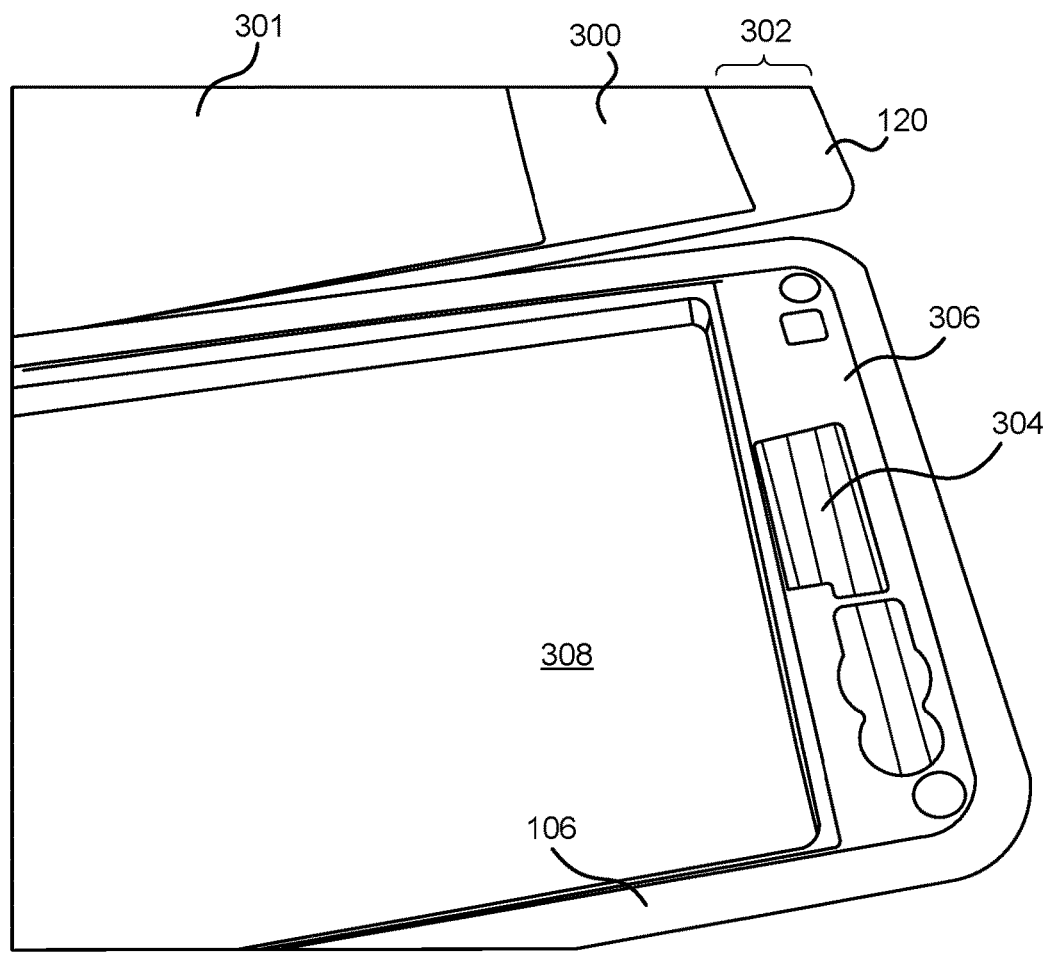
FIG. 3 is a schematic diagram of a disassembled mobile communications device.

In some examples the air channel is formed from cut away regions in filling material held under the transparent layer as now described with reference to FIG. 3. FIG. 3 shows a disassembled mobile communications device in which the transparent layer 120, layer of display material 300, and a piezo electric element 301 have been removed from the housing 110. The layer of display material forms a display module which extends over the front face of the device and is partly obscured by the piezo-electric element 301 in FIG. 3. The display module does not extend over region 302 of the transparent layer 120. Thus the layer of transparent material 120 has a non display region 302 which is a region under which no display material 300 is present. The non display region 302 is sized and shaped to rest on the housing 106 such that an air tight contact is formed between at least part of the non-display region 302 and a filling material 306 layered on the housing 110. An interior volume 308 is visible within the housing 106 and this volume forms the air cavity as described in more detail with reference to FIG. 5.

Figure 4:
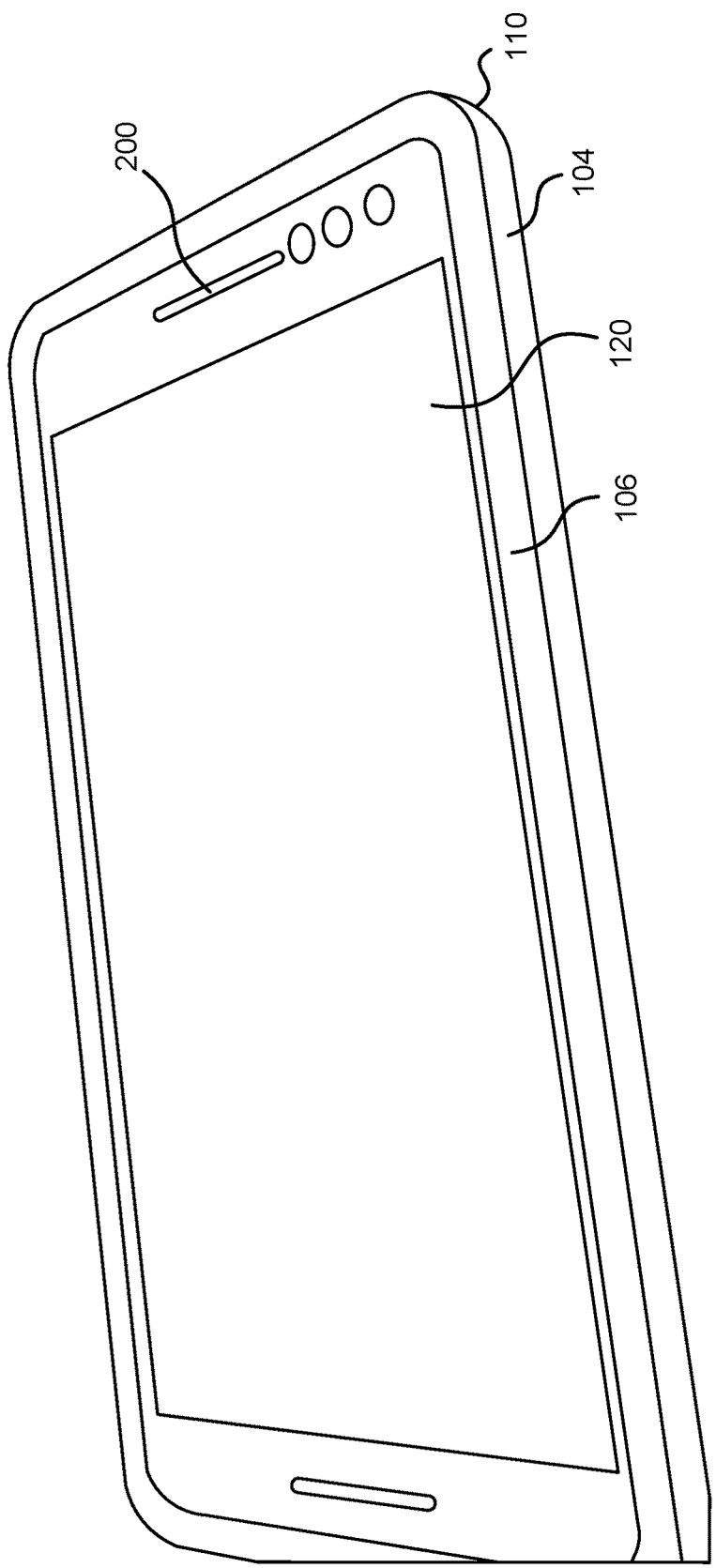
FIG. 4 is a schematic diagram of the mobile communications device of FIG. 3 when assembled.

The filling material 306 is impervious to air and comprises one or more cut away regions 304 which form the air channel between the air cavity and the entrance 200. When the layer of transparent material 120 and layer of display material 300 are assembled onto the housing 110 the mobile communications device appears as in FIG. 4 and the entrance 200 is visible. The layer of transparent material 200 is pressed against the filling material 306 as a result of the layered construction being gripped together by the housing 110 as illustrated in FIG. 4. For example, the layer of display material 300 is supported under at least part of the layer of transparent material 120 by being held between the housing 110 and the layer of transparent material 120.

In examples, the mobile communications device 100 has a layer of filling material 306, substantially impervious to air, the filling material 306 being held under the transparent layer 120 and having one or more cut away regions 304, the cut away regions 304 forming at least one channel from the entrance 200 to the air cavity.

Figure 5:
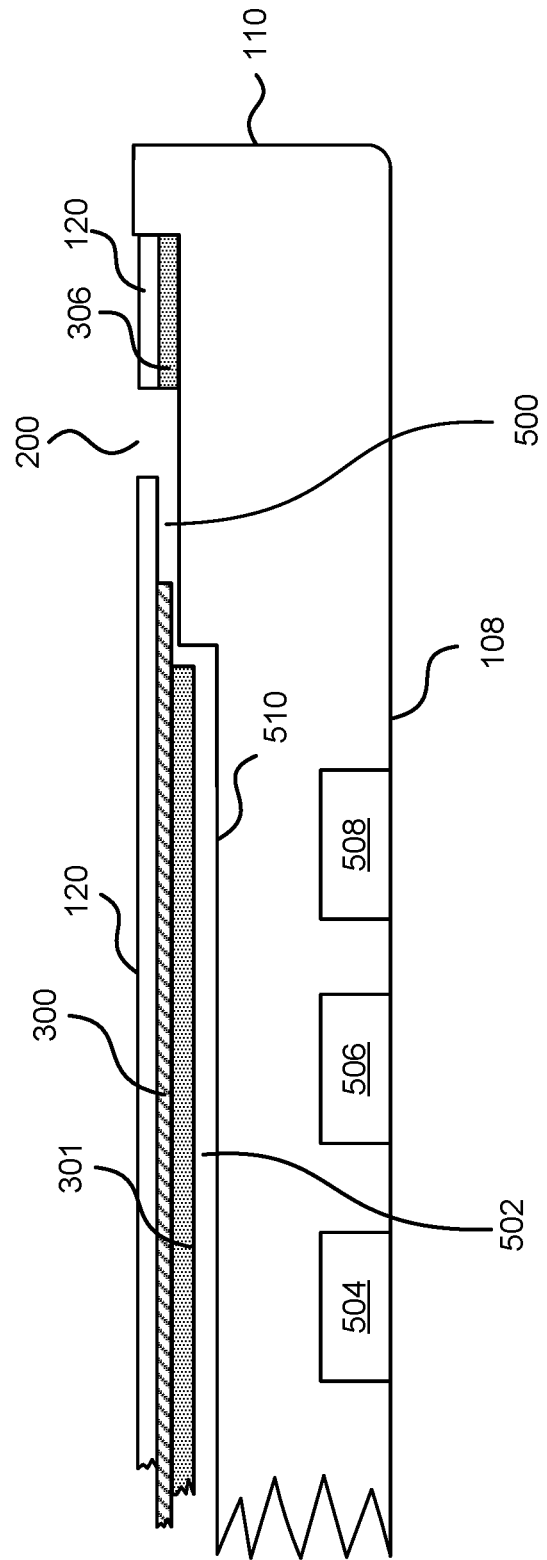
FIG. 5 is a schematic diagram of a cross section of the mobile communications device of FIG. 2.

FIG. 5 is a cross section taken along line A-A of FIG. 2 and it shows an example of an air cavity 502 in the housing 110 under the transparent layer 120, the display module 300 and the piezo-electric element 301. The air cavity in this example has at least one wall 510 being substantially planar with the front face 106 of the communications device 100 and held in the housing 110 under the layer of display material 300. The wall 510 is formed from rigid or flexible material which is impervious to air. In some examples the wall 510 is substantially rigid and is spaced from the layer of display material 300 by as little as about 0.5 millimeters or less such as about 0.2 to 0.4 millimeters for hand held mobile communications device configurations. For example, the air cavity wall 510 is sized and positioned such that the air cavity contacts a majority of a surface of the layer of display material 300.

FIG. 5 shows schematically electronic components 504, 506 held in the housing between the air cavity wall and the back face. For example, these are electronic components for functionality of the mobile communications device 100 as described in more detail with reference to FIG. 6. In some examples the display actuating element 508 is held in the housing between the air cavity wall 510 and the back face 108. The electronic components 504, 506 comprise an amplifier held in the housing 110 and connected to the display actuating element.

The mobile communications device in FIG. 5 shows the layer of display material 300 supported under at least part of the layer of transparent material 120. This is achieved by holding the layer of display material 300 between the side faces of the housing 110 and the layer of transparent material.

In the examples described with reference to FIGS. 3, 4 and 5, the entrance 200 is in the layer of transparent material and an air channel 500 passes from the entrance to the air cavity 502 behind the layer of display material 300 and piezo-electric element 301. However, in some cases the layer of display material 120 itself has an air way leading from the entrance to an air cavity 502 behind the layer of display material. Therefore in some examples, the mobile communications comprises at least one slot, hole or mesh in the display material 300, the slot, hole or mesh being positioned relative to the entrance in the layer of transparent material to allow air to pass between the air cavity 502 and an exterior of the device.

Figure 6:
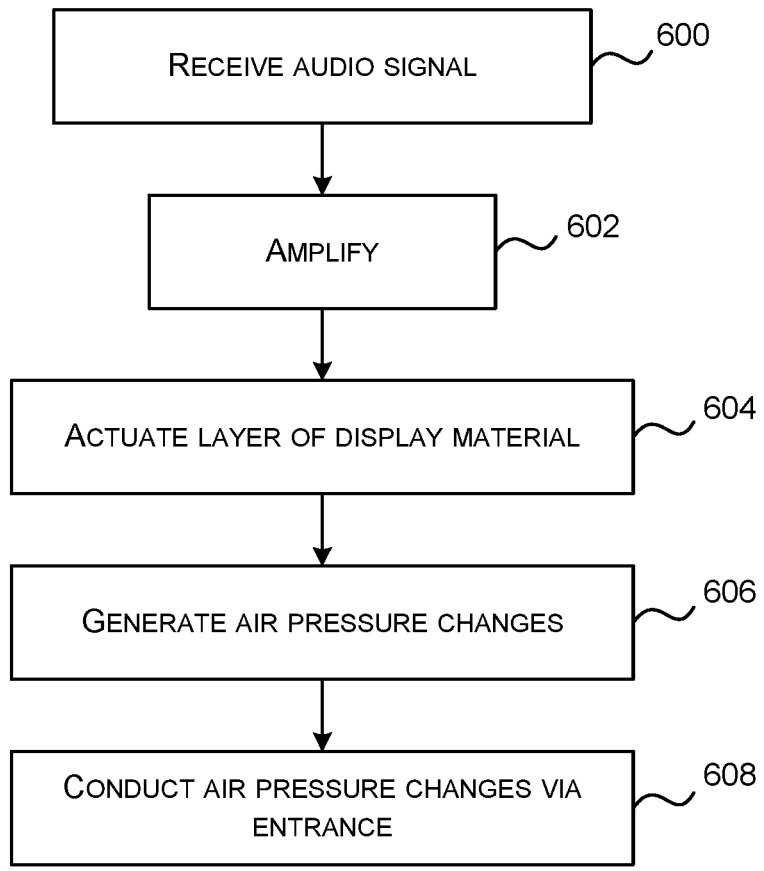
FIG. 6 is a flow diagram of a method of operation of a mobile communications device.

With reference to FIG. 6, during operating of a mobile communications device, such as that of FIGS. 1 to 5, an audio signal is received 600 such as an incoming phone call. The audio signal is amplified 602 and used to actuate a layer of display material 604. The layer of display material is supported under at least part of a layer of transparent material, the transparent material substantially covering a front face of a housing of the mobile communications device. Actuating 604 the layer of display material comprises using an actuating element in the housing to flex the display and the layer of transparent material to generate 606 changes in air pressure in at least one air cavity formed between the layer of display material and the housing. The method comprises conducting 608 the changes in air pressure from the at least one air cavity to an exterior of the device via an entrance formed in the layer of transparent material.

Figure 7:
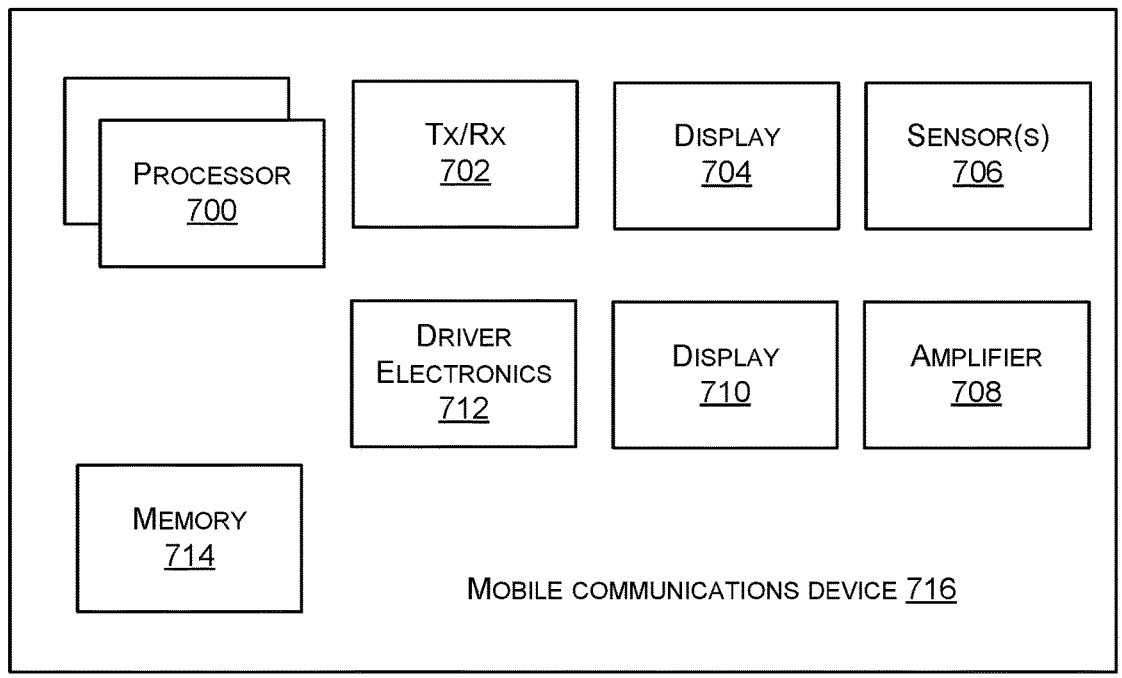
FIG. 7 is a schematic diagram of a mobile communications device

FIG. 7 is a schematic diagram of a mobile communications device 716 such as any of the mobile communications devices of FIGS. 1 to 5.

The mobile communications device comprises one or more processors 700 which are microprocessors, controllers or any other suitable type of processors for processing computer executable instructions to control the operation of the device in order to reproduce audio signals from a display 704 as well as carry out functions of a mobile communications device. In some examples, for example where a system on a chip architecture is used, the processors 700 include one or more fixed function blocks (also referred to as accelerators) which implement a part of the method of FIG. 6 in hardware (rather than software or firmware). Platform software comprising an operating system or any other suitable platform software is provided at the computing-based device to enable application software to be executed on the device.

The mobile communications device has a display 704 such as a layer of POLED material or other display material, a transceiver 702 for radio communications, an amplifier 708, and at least one actuating element 710 to move the display 704 such that it generates sound waves. The mobile communications device has driver electronics 712 to control the transceiver, amplifier 708 and display actuator 710 and also to control one or more optional sensors 706 such as accelerometers, light sensors, cameras, global positioning system sensors and others. The mobile communications device has memory 714.

The computer executable instructions are provided using any computer-readable media that is accessible by the mobile communications device 716. Computer-readable media includes, for example, computer storage media such as memory 714 and communications media. Computer storage media, such as memory 714, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 714) is shown within the mobile communications device 716 it will be appreciated that the storage is, in some examples, distributed or located remotely and accessed via a network or other communication link (e.g. using transceiver 702). The display 704 may provide a graphical user interface and in some examples is a touch sensitive display 704.

Figure 8:
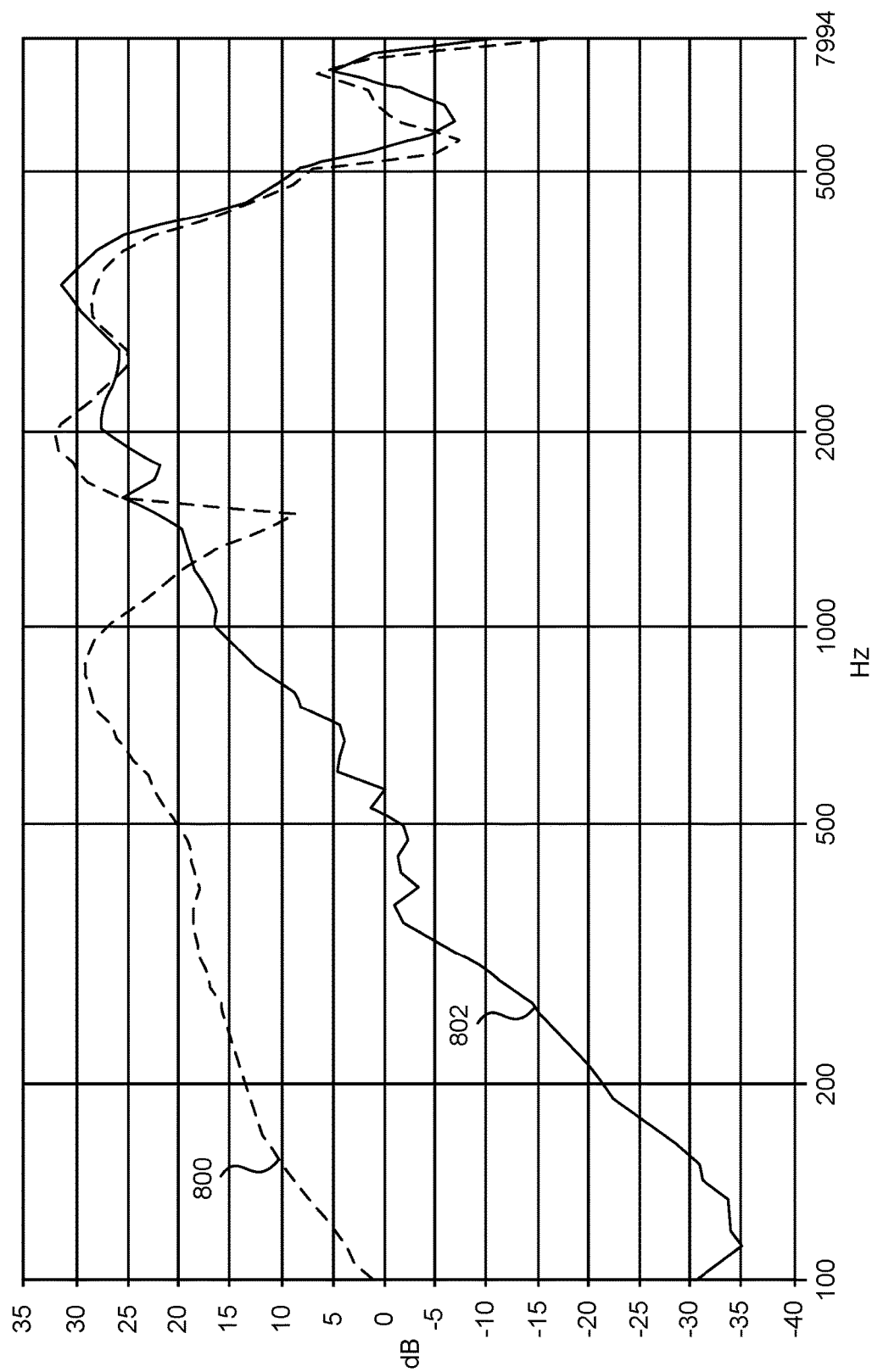
FIG. 8 is a graph of frequency response for a mobile communications device such as that of FIGS. 3 and 4 with the entrance open or closed.

Empirical testing of the mobile communications device of FIGS. 3 and 4 has found the entrance 200 and air way to be particularly effective at boosting low frequencies of audio signals reproduced by the device. For example, FIG. 8 is a graph of decibels against frequency (in units of Hertz) for the situation where the entrance 200 is open (line 800) and in the situation where the entrance 200 is sealed in an air tight manner (line 802). The decibels represent the sound loudness, for particular sound frequencies, as recorded by a microphone positioned less than one meter away from the mobile communications device. The zero decibel value (denoted 0 dB in FIG. 8) is a standardized reference point. A comparison of the two curves 800 and 802 of FIG. 8 gives information about the changes gained by using the open entrance 200.

The measurements in FIG. 8 were obtained under the conditions specified in 3GPP TS26.132 chapter 8.4.2 and with the mobile communications device positioned into a head and torso simulator according to ITU-T P.64 Annex E. It is seen from FIG. 8 that, for an audio signal at 200 Hertz, the increase in decibels caused by having the open entrance is roughly 35 decibels. It is also seen from FIG. 8 that, for an audio signal at 1 kHz the increase in decibels caused by having the open entrance is roughly 10 decibels.

Figure 9:
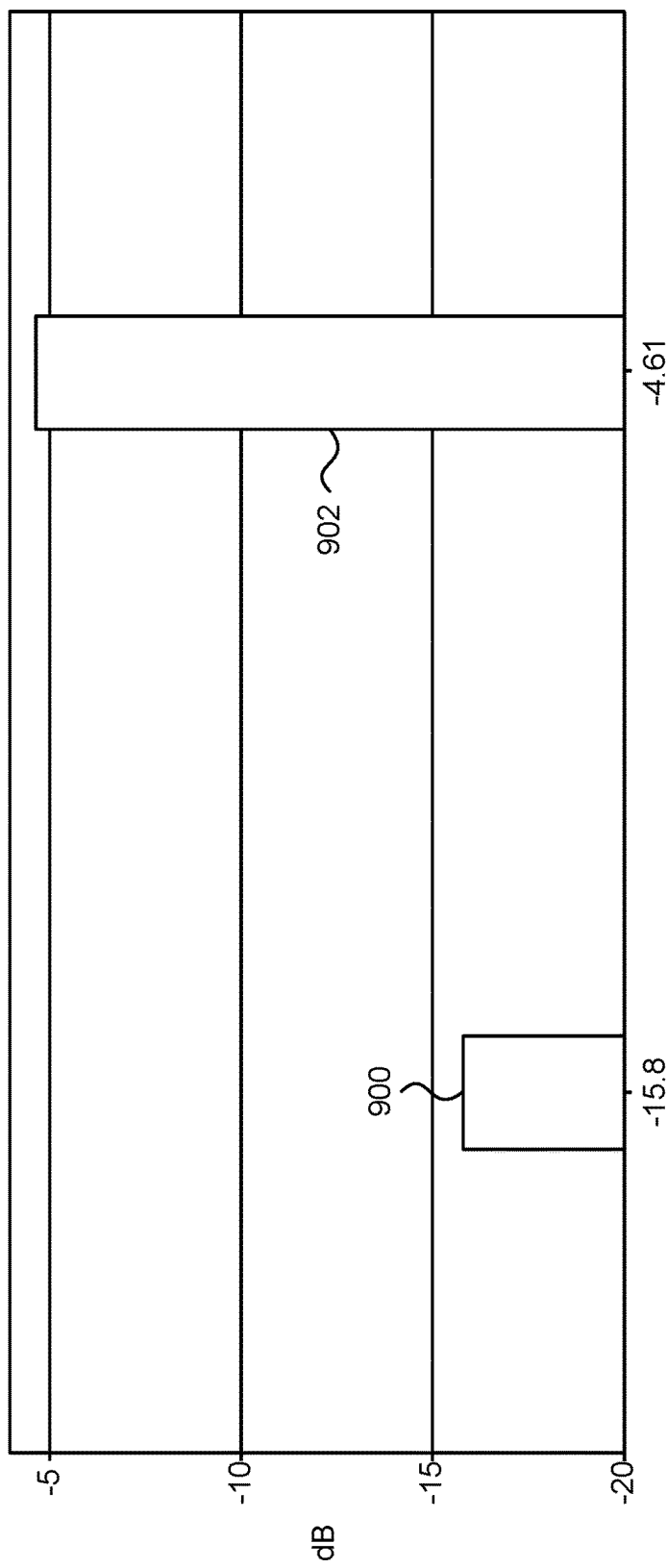
FIG. 9 is a graph of loudness measured in decibels for a mobile communications device such as that of FIGS. 3 and 4 with the entrance open or closed.

FIG. 9 is a bar chart of decibels recorded by the microphone (positioned as for FIG. 8) as per 3GPP TS26.132 chapter 8.2.2.2 for the whole signal (rather than for different frequencies of the audio signal). Here the decibels are −15.8 for the situation where the entrance is open (see bar 900 in FIG. 9) and this indicates that the loudness is more than required for the levels specified in telecommunications standards such as 3GPP TS26.131 or others, as well as various levels specified by telecommunications operators. Thus there is reduced need for any electronic amplifier and the power requirements of the mobile communications device are reduced. In the case where the entrance has an air-tight seal the decibels are −4.61 (see bar 902) and this indicates that the loudness is less than required for the relevant telecommunications requirements. This result represents loss of loudness, so in FIG. 9 the more negative the result the louder the sound.

Figure 10:
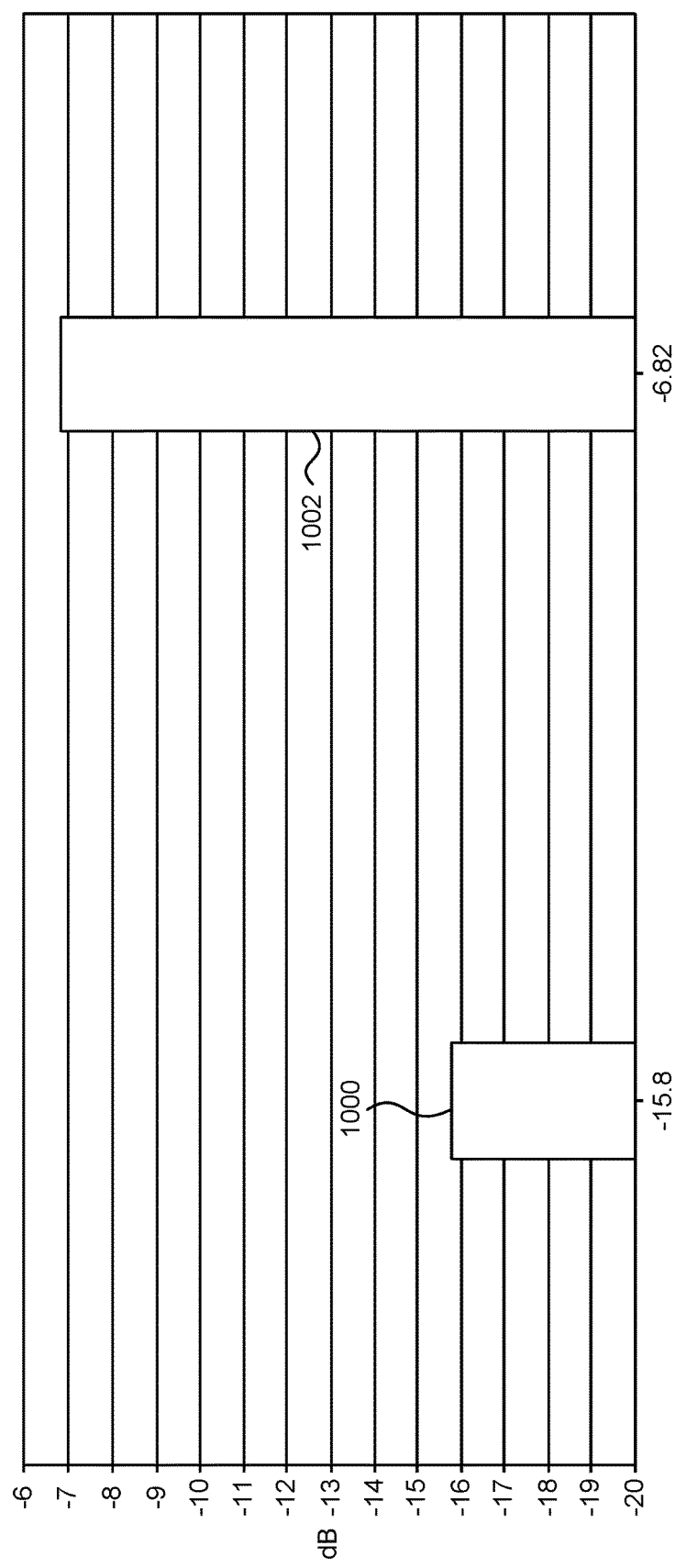
FIG. 10 is a graph of loudness measured in decibels for a mobile communications device such as that of FIGS. 3 and 4 with the entrance open or closed, and where digital amplification is used in one case.

FIG. 10 is a bar chart of decibels recorded by the microphone for cases in which the entrance is open. Here the decibels are −15.8 for the situation where the entrance is open and no signal attenuation is applied (see bar 1000 in FIG. 9). This indicates that the loudness is more than required even with no signal attenuation provided by an electronic amplifier used in the mobile communications device. In the case where the entrance is open and digital amplification of about 9 decibels is used, the measured decibels at the microphone are −6.82 (see bar 1002) and this indicates that the loudness is adequate to meet relevant telecommunications standards such as those mentioned above. This result represents loss of loudness so more negative values indicate louder sound.

Figure 11:
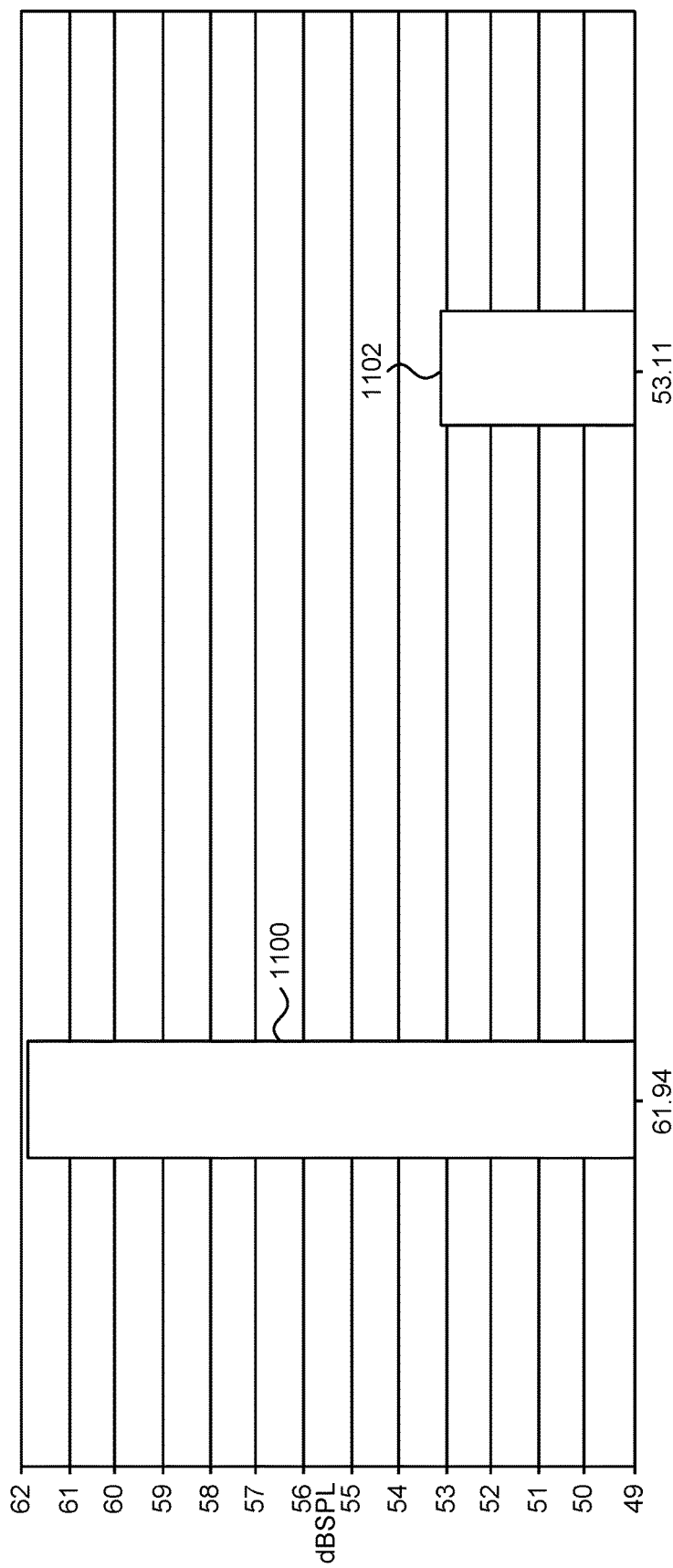
FIG. 11 is a graph of loudness measured in decibels sound pressure level (dBSPL) for a mobile communications device such as that of FIGS. 3 and 4 with the entrance open or closed, and where digital amplification is used in one case.

FIG. 11 is a bar chart of decibels sound pressure level (dBSPL) recorded by the microphone (which is less than one meter away from the mobile communications device) in the case that signal attenuation provided by an electronic amplifier used in the mobile communications device is used for the 53.11 dBSPL result but not the 61.94 dBSPL result. The entrance 200 is open for both results but 9 dB attenuation has been applied in the case of the 53.11 dBSPL result. The measure of dBSPL provides an indication of privacy leakage since it represents the sound pressure level in dB as heard by a person standing next to you less than one meter away.

Here the dBSPL level is 61.94 for the situation where the entrance is open (see bar 1100 in FIG. 11) and this indicates the privacy level heard by a person next to you less than one meter away with no digital amplification. In the case where digital attenuation of about 9 decibels is used and the entrance is open, the measured dBSPL at the microphone is 53.11 (see bar 1102) and this indicates that the sound pressure level heard by person next to you has been reduced yielding to smaller privacy leakage. In this case the smaller the result the quieter the sound.

Alternatively or in addition to the other examples described herein, examples include any combination of the following:

An audio device comprising
a housing holding electronic components and having face being substantially covered by a layer of transparent material;
a display comprising a layer of display material supported under at least part of the layer of transparent material;
at least one display actuating element in the housing configured to flex the display and the layer of transparent material to generate sound waves;
at least one air cavity formed between the layer of display material and the housing; and
wherein there is an entrance formed in the layer of transparent material to allow air to pass between the air cavity and an exterior of the device.

The audio device described above wherein the entrance comprises any one or more of: at least one slot in the layer of transparent material, a hole in the layer of transparent material, a mesh in the layer of transparent material.

The audio device described above comprising at least one slot, hole or mesh in the display material, the slot, hole or mesh being positioned relative to the entrance in the layer of transparent material to allow air to pass between the air cavity and an exterior of the device.

The audio device described above wherein the face comprises a non-display region being a region of the transparent material under which the display material is absent, and wherein the entrance is in the non-display region.

The audio device described above comprising an air channel from the entrance to the air cavity.

The audio device described above wherein the channel is formed from cut away regions in filling material held under the transparent layer.

The audio device described above comprising a layer of filling material, substantially impervious to air, the filling material being held under the transparent layer and having one or more cut away regions, the cut away regions forming at least one channel from the entrance to the air cavity.

The audio device described above comprising at least one air cavity wall being substantially planar with the face and held in the housing under the display.

The audio device described above wherein the air cavity wall is sized and positioned such that the air cavity contacts a majority of a surface of the display layer.

The audio device described above wherein the electronic components are held in the housing between the air cavity wall and a back face of the audio device.

The audio device described above wherein the display actuating element is held in the housing between the air cavity wall and a back face of the audio device.

The audio device described above wherein the layer of display material is supported under at least part of the layer of transparent material by being held between the housing and the layer of transparent material.

The audio device described above wherein the entrance is substantially sealed against moisture and dust particles using a protective material which is pervious to air.

The audio device described above wherein the entrance is located substantially at an edge of the face.

The audio device described above which is sized and shaped to be held in one hand and placed against an ear of a user, and wherein the entrance is located substantially in the center of an edge of the face.

The audio device described above comprising an amplifier held in the housing and connected to the display actuating element.

The audio device described above comprising a microphone and wherein the entrance is positioned away from the microphone.

A method of operating an audio device comprising:
actuating a display comprising a layer of display material supported under at least part of a layer of transparent material, the transparent material substantially covering a face of a housing of the audio device;
actuating the display comprising using an actuating element in the housing to flex the display and the layer of transparent material to generate sound waves and to cause changes in air pressure in at least one air cavity formed between the layer of display material and the housing; and
conducting the changes in air pressure from the at least one air cavity to an exterior of the device via an entrance formed in the layer of transparent material.

The method described above comprising conducting the changes in air pressure using an air channel formed between the air cavity and the at least one entrance.

The method described above comprising using the air cavity, air channel and the at least one entrance to increase low frequencies of the generated sound waves.

A mobile communications device comprising:
means for actuating a display comprising a layer of display material supported under at least part of a layer of transparent material, the transparent material substantially covering a face of a housing of the mobile communications device;
wherein the means for actuating the display is configured to flex the display and the layer of transparent material to generate sound waves and to cause changes in air pressure in at least one air cavity formed between the layer of display material and the housing; and
means for conducting the changes in air pressure from the at least one air cavity to an exterior of the device via an entrance formed in the layer of transparent material.

For example, the means for actuating the display comprises any one or more of: a piezo electric element, a piezo electric motor, a dynamic motor, an electro-static motor. For example, the means for conducting the changes in air pressure comprises a channel from the air cavity to the entrance.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An audio device comprising:
   a housing holding electronic components and having a face being substantially covered by a layer of transparent material;
   a display comprising a layer of display material supported under at least part of the layer of transparent material;
   at least one display actuating element in the housing configured to flex the display and the layer of transparent material to generate sound waves;
   at least one air cavity formed between the layer of display material and the housing, the at least one air cavity configured to generate additional sound waves in response to changes in air pressure from flexing of the layer of transparent material, the additional sound waves being of lower frequency than the sound waves generated by the transparent material; and
   wherein there is an entrance formed in the layer of transparent material to allow air to pass between the air cavity and an exterior of the device.

2. The audio device of claim 1 wherein the entrance comprises any one or more of: at least one slot in the layer of transparent material, a hole in the layer of transparent material, a mesh in the layer of transparent material.

3. The audio device of claim 1 comprising at least one slot, hole or mesh in the display material, the slot, hole or mesh being positioned relative to the entrance in the layer of transparent material to allow air to pass between the air cavity and an exterior of the device.

4. The audio device of claim 1 wherein the face comprises a non-display region being a region of the transparent material under which the display material is absent, and wherein the entrance is in the non-display region.

5. The audio device of claim 4 comprising an air channel from the entrance to the air cavity.

6. The audio device of claim 5 wherein the channel is formed from cut away regions in filling material held under the transparent layer.

7. The audio device of claim 1 comprising a layer of filling material, substantially impervious to air, the filling material being held under the transparent layer and having one or more cut away regions, the cut away regions forming at least one channel from the entrance to the air cavity.

8. The audio device of claim 1 comprising at least one air cavity wall being substantially planar with the face and held in the housing under the display.

9. The audio device of claim 8 wherein the air cavity wall is sized and positioned such that the air cavity contacts a majority of a surface of the display layer.

10. The audio device of claim 8 wherein the electronic components are held in the housing between the air cavity wall and a back face of the audio device.

11. The audio device of claim 8 wherein the display actuating element is held in the housing between the air cavity wall and a back face of the audio device.

12. The audio device of claim 1 wherein the layer of display material is supported under at least part of the layer of transparent material by being held between the housing and the layer of transparent material.

13. The audio device of claim 1 wherein the entrance is substantially sealed against moisture and dust particles using a protective material which is pervious to air.

14. The audio device of claim 1 wherein the entrance is located substantially at an edge of the face.

15. The audio device of claim 1 which is sized and shaped to be held in one hand and placed against an ear of a user, and wherein the entrance is located substantially in the center of an edge of the face.

16. The audio device of claim 1 comprising an amplifier held in the housing and connected to the display actuating element.

17. The audio device of claim 1 comprising a microphone and wherein the entrance is positioned away from the microphone.

18. A method of operating an audio device comprising:
   actuating a display comprising a layer of display material supported under at least part of a layer of transparent material, the transparent material substantially covering a face of a housing of the audio device;
   actuating the display comprising using an actuating element in the housing to flex the display and the layer of transparent material to generate sound waves and to cause changes in air pressure in at least one air cavity formed between the layer of display material and the housing;
   generate, using the at least one air cavity, additional sound waves in response to changes in air pressure from flexing of the layer of transparent material, the additional sound waves being of lower frequency than the sound waves generated by the transparent material
   conducting the changes in air pressure from the at least one air cavity to an exterior of the device via an entrance formed in the layer of transparent material.

19. The method of claim 18 comprising conducting the changes in air pressure using an air channel formed between the air cavity and the at least one entrance.

20. A mobile communications device comprising:
   means for actuating a display comprising a layer of display material supported under at least part of a layer of transparent material, the transparent material substantially covering a face of a housing of the mobile communications device;
   wherein the means for actuating the display is configured to flex the display and the layer of transparent material to generate sound waves and to cause changes in air pressure in at least one air cavity formed between the layer of display material and the housing, the at least one air cavity configured to generate additional sound waves in response to changes in air pressure from flexing of the layer of transparent material, the additional sound waves being of lower frequency than the sound waves generated by the transparent material; and
   means for conducting the changes in air pressure from the at least one air cavity to an exterior of the device via an entrance formed in the layer of transparent material.

* * * * *